(12) United States Patent
Reiser

(10) Patent No.: US 7,931,996 B2
(45) Date of Patent: Apr. 26, 2011

(54) FUEL CELL WITH RANDOMLY-DISPERSED CARBON FIBERS IN A BACKING LAYER

(75) Inventor: Carl A. Reiser, Stonington, CT (US)

(73) Assignee: UTC Power Corporation, South Windsor, CT (US)

( * ) Notice: Subject to any disclaimer, the term of this patent is extended or adjusted under 35 U.S.C. 154(b) by 1136 days.

(21) Appl. No.: 11/638,147

(22) Filed: Dec. 13, 2006

(65) Prior Publication Data

US 2007/0111882 A1     May 17, 2007

Related U.S. Application Data

(62) Division of application No. 10/747,373, filed on Dec. 29, 2003, now abandoned.

(51) Int. Cl.
*H01M 8/02*      (2006.01)
*H01M 8/10*      (2006.01)
(52) U.S. Cl. ....................... 429/481; 429/480
(58) Field of Classification Search ............. 429/40–45, 429/480, 481
See application file for complete search history.

(56) References Cited

U.S. PATENT DOCUMENTS

| | | | | |
|---|---|---|---|---|
| 5,635,039 A | * | 6/1997 | Cisar et al. | 204/252 |
| 6,127,059 A | * | 10/2000 | Kato | 429/481 |
| 6,667,127 B2 | * | 12/2003 | Beattie et al. | 429/535 |
| 6,896,991 B2 | * | 5/2005 | Okamoto | 429/481 |
| 6,960,407 B2 | * | 11/2005 | Shibata et al. | 429/480 |
| 2003/0124414 A1 | * | 7/2003 | Hertel et al. | 429/44 |

* cited by examiner

*Primary Examiner* — Tracy Dove
(74) *Attorney, Agent, or Firm* — Malcolm J. Chisholm, Jr.

(57) ABSTRACT

A fuel cell (40) includes first and second catalysts (12'), (14') secured to opposed surfaces of an electrolyte (16'); a first flow field (26') secured in fluid communication with the first catalyst (12') defining a plurality of flow channels (30A', 30B', 30C', 30D') between a plurality of ribs (32A', 32B', 32C', 32D', 32E') of the first flow field (26'); and a backing layer (42) secured between the first flow field (26') and the first catalyst (12'). The backing layer (42) includes a carbon black, a hydrophobic polymer, and randomly-dispersed carbon fibers (44). The carbon fibers (44) are at least twice as long as a width (46) of the flow channels (30A', 30B', 30C', 30D') defined in the adjacent first flow field (26'). The backing layer (42) replaces a known substrate (22) and diffusion layer (18).

2 Claims, 2 Drawing Sheets

FUEL CELL WITH RANDOMLY-DISPERSED CARBON FIBERS IN A BACKING LAYER

CROSS REFERENCE TO RELATED APPLICATION

This application is a divisional application of U.S. patent application Ser. No. 10/747,373 filed on Dec. 29, 2003 now abandoned.

TECHNICAL FIELD

The present invention relates to fuel cells that are suited for usage in transportation vehicles, portable power plants, or as stationary power plants, and the invention especially relates to a fuel cell having a backing layer secured between a flow field and a catalyst.

BACKGROUND ART

Fuel cells are well-known and are commonly used to produce electrical energy from reducing and oxidizing reactant fluids to power electrical apparatus, such as apparatus on-board space vehicles, transportation vehicles, or as on-site generators for buildings. Each individual fuel cell generally includes an anode catalyst and a cathode catalyst separated by an electrolyte, such as a proton exchange membrane ("PEM") as known in the art. Frequently, a diffusion layer is secured between the catalyst and a substrate layer. The substrate layer is usually secured between the diffusion layer and a flow field. If there is no diffusion layer, the substrate is secured between the catalyst and the flow field. Flow fields define flow channels for directing reactant streams through the fuel cell in fluid communication through the diffusion and substrate layers with the catalysts. As is known, the flow fields may be porous water transport plates or solid separator plates.

The diffusion layer is typically a highly porous, electrical conductor made from carbon black and a hydrophobic polymer, such as polytetrafluoroethylene. Depending on the fuel cell design, the diffusion layer is usually hydrophobic, however, the diffusion layer may be partially hydrophobic and partially hydrophilic to facilitate simultaneous liquid and gaseous transport through the layer. The diffusion layer is usually about 25-100 microns thick. The diffusion layer facilitates transfer of the reactant streams through the fuel cell by minimizing the thickness of water films on the surface of the catalysts. The diffusion layer also facilitates the removal of product water from the fuel cell.

The substrate layer adjacent the diffusion layer is highly porous and made from expensive carbon fibers and a well known manufacturing process that requires high temperature graphitizing. Depending on the cell design, the substrate layer may be either hydrophobic or hydrophilic. The substrate is usually about 150-300 microns thick. The substrate facilitates the transport of reactant streams, water vapor, liquid water and electrons. The substrate conducts electrons both through the plane of the substrate and in the plane of the substrate from a centerline of an adjacent flow channel to ribs of the flow field, wherein the flow channel is defined between ribs of the flow field. The substrate also facilitates the diffusion and flow of reactant streams and product water both through the plane of the substrate and in the plane of the substrate from the flow channel to the centerline of the flow channel beneath the rib of the flow field, or vice versa. Also, the substrate must have a flexural strength adequate to distribute an axial pressure load relatively uniformly over total surface areas of adjacent layers. For example, the pressure load must be distributed evenly across the flow channels of the flow field to prevent the substrate from deforming into the flow channels. An exemplary flexural strength is about 200 kilogram force per square centimeter ("kgf/cm$^2$"). U.S. Pat. No. 4,851,304 to Miwa et al. describes properties of typical fuel cell substrates. Planar types of fuel cells are secured in compression in a fuel cell stack by a combination of pressure plates and tie-rods, as is well known. This axial compressive force minimizes the resistance of the cells and is required to obtain suitable fluid seals. The substrate must have a compressive strength that is typically at least two times the axial force on the cell stack. Typical compressive strength of a prior art substrate is greater than 10 kgf/cm$^2$.

In fuel cells of the prior art, it is known that carbon or graphite layers or papers are traditionally secured between the catalysts and flow fields as diffusion and/or substrate layers. However, the use of known carbon or graphite layers or papers presents significant problems, including high manufacturing costs, impeding the diffusion of hydrogen and oxygen through pores defined by the layers, and impeding the outflow of fuel cell product water from a cathode catalyst.

A partial solution to the use of carbon or graphite paper is disclosed in U.S. Pat. No. 5,707,755, entitled "PEM/SPE Fuel Cell" that issued on Jan. 13, 1998 to Grot. The patent discloses, instead of the carbon or graphite layers or papers, the use of a plurality of electrically conductive filaments secured with a specific orientation with respect to flow channels, or grooves of a flow field. The specific orientation is longitudinal so that the filaments extend across, and do not fall into, the flow channels, or grooves, that direct reactant flow through the fuel cell.

Nonetheless, the prior art has limitations. Manufacturing a fuel cell with conductive filaments having such a specific orientation imposes substantial cost and manufacturing burdens. Moreover, the prior art fails to rectify the significant substrate manufacturing costs associated with the mass production of fuel cells. The substrates are costly because they include expensive carbon fibers and are manufactured through a costly high temperature graphitizing process well known in the art. Accordingly, there is a need for a fuel cell that minimizes substrate costs by replacing the prior art substrates with a cost effective material.

DISCLOSURE OF INVENTION

The invention is a fuel cell with randomly-dispersed carbon fibers in a backing layer of the fuel cell. The fuel cell produces electricity from reducing fluid and oxygen containing oxidant reactant streams, and comprises first and second catalysts secured to opposed surfaces of an electrolyte, such as a proton exchange membrane ("PEM") well known in the art. A first flow field is secured in fluid communication with the first catalyst, the first flow field defining a plurality of flow channels between a plurality of ribs of the first flow field. The backing layer is secured between and in fluid communication with the first flow field and the first catalyst so that the backing layer is at least coextensive with the first flow field and the first catalyst. The backing layer is made from between 5 weight percent ("wt %") and 25 wt % carbon black, between 50 wt % and 90 wt % carbon fibers, and between 5 wt % and 25 wt % of a hydrophobic polymer. For purposes herein, a "hydrophobic polymer" is defined as a polymer having a surface energy that is less than 40 dynes/cm$^2$. Examples of hydrophobic polymers known in the art are polytetrafluoroethylene and polyvinyldene fluoride. The carbon fibers are randomly dispersed with the carbon black and hydrophobic polymer so that the backing layer, which is bonded to the first catalyst layer and secured between the first catalyst and the first flow field, has a thickness between the first catalyst and the first flow field of between about 25 and about 250 microns, and a compressive strength greater than 5 kgf/cm². Because the backing layer replaces the costly substrate and diffusion layers, fuel cell manufacturing costs and requirements are minimized.

In a preferred embodiment, the first catalyst is an anode catalyst and the fuel cell includes a diffusion layer and substrate or substrate layer between the second catalyst and second flow field. The invention includes a method of manufacturing the backing layer including the steps of: (a) dispersing the carbon black, carbon fibers, and hydrophobic polymers in an aqueous suspension, (b) removing the water by filtration; (c) thermally processing the constituents of the layer to melt or cure the hydrophobic polymer. The layer may then be bonded to the anode catalyst by known means.

Accordingly, it is a general purpose of the present invention to provide a fuel cell with randomly-dispersed carbon fibers in a backing layer that overcomes deficiencies of the prior art.

It is a more specific purpose to provide a fuel cell with randomly-dispersed carbon fibers in a backing layer that provides a cost effective fuel cell by substituting an anode backing layer for substrate and diffusion layers.

These and other purposes and advantages of the present fuel cell with randomly-dispersed carbon fibers in a backing layer will become more readily apparent when the following description is read in conjunction with the accompanying drawings.

DESCRIPTION OF THE PREFERRED EMBODIMENTS

Figure 1:
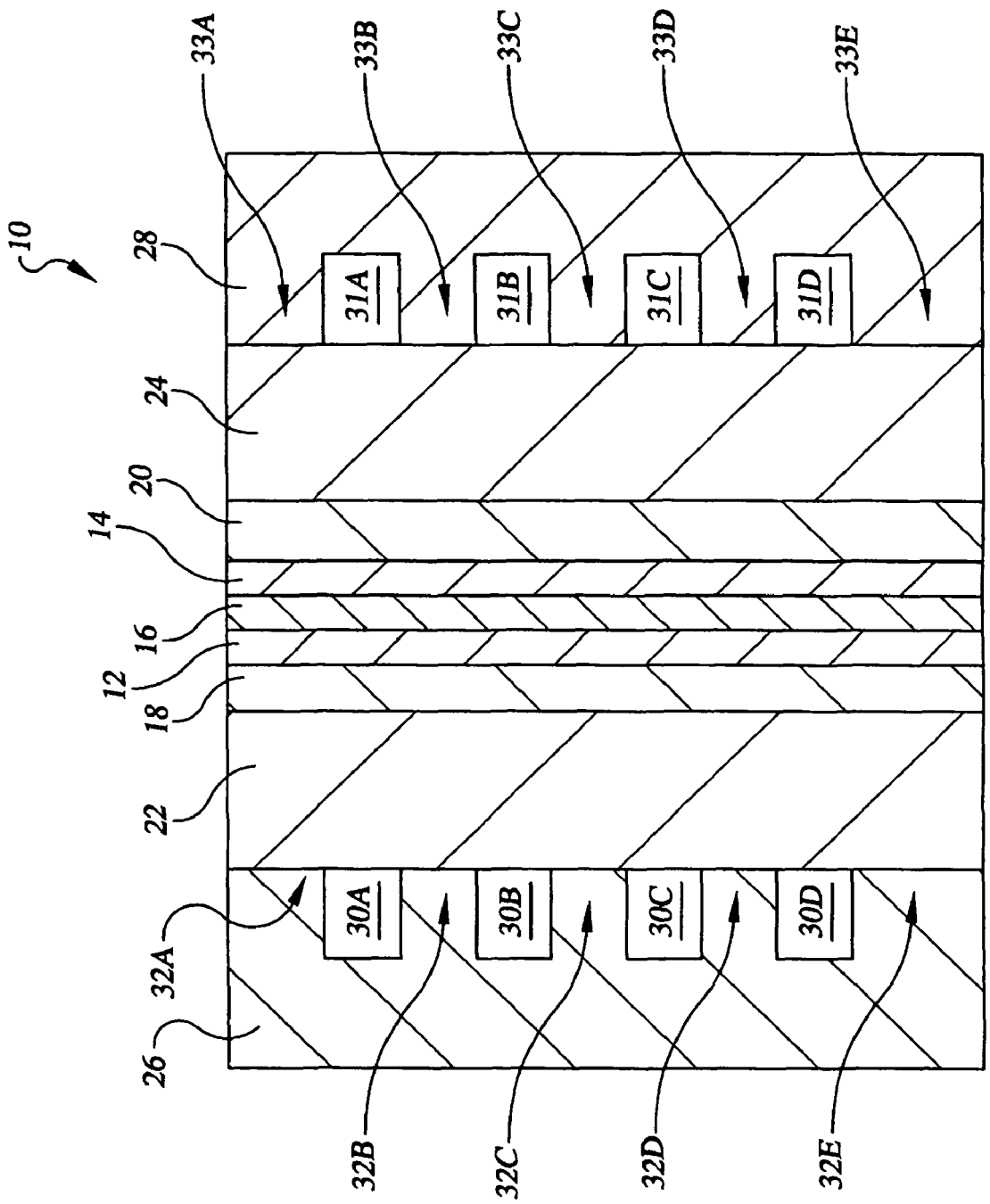
FIG. 1 is a simplified schematic representation of a prior art fuel cell.

Referring to the drawings in detail, a typical prior art fuel cell is shown in FIG. 1 and is designated by the reference numeral 10. As is well known in the art, the fuel cell 10 includes a first catalyst 12, such as an anode catalyst, and a second catalyst 14, such as a cathode catalyst, secured to opposed surfaces of an electrolyte 16, such as a proton exchange membrane ("PEM"). The fuel cell 10 also includes an anode diffusion layer 18 secured to the first catalyst 12 and a cathode diffusion layer 20 secured to the second catalyst 14; an anode substrate 22 or substrate layer secured to the anode diffusion layer 18 and a cathode substrate 24 secured to the cathode diffusion layer 20; a first flow field 26 secured in fluid communication with the first catalyst 12; and, a second flow field 28 secured in fluid communication with the second catalyst 14.

The first flow field 26 defines a plurality of flow channels 30A, 30B, 30C, 30D between a plurality of ribs 32A, 32B, 32C, 32D, 32E of the first flow field 26. The second flow field 28 defines a plurality of flow channels 31A, 31B, 31C, 31D between a plurality of ribs 33A, 33B, 33C, 33D, 33E of the flow field 28. The operation of such a prior art fuel cell 10 is well known in the art as disclosed in U.S. Pat. No. 6,322,915, entitled "Humidification System For A Fuel Cell Power Plant" that issued on Nov. 27, 2001 to Collins et al., which patent is owned by the owner of all rights in the present invention.

Figure 2:
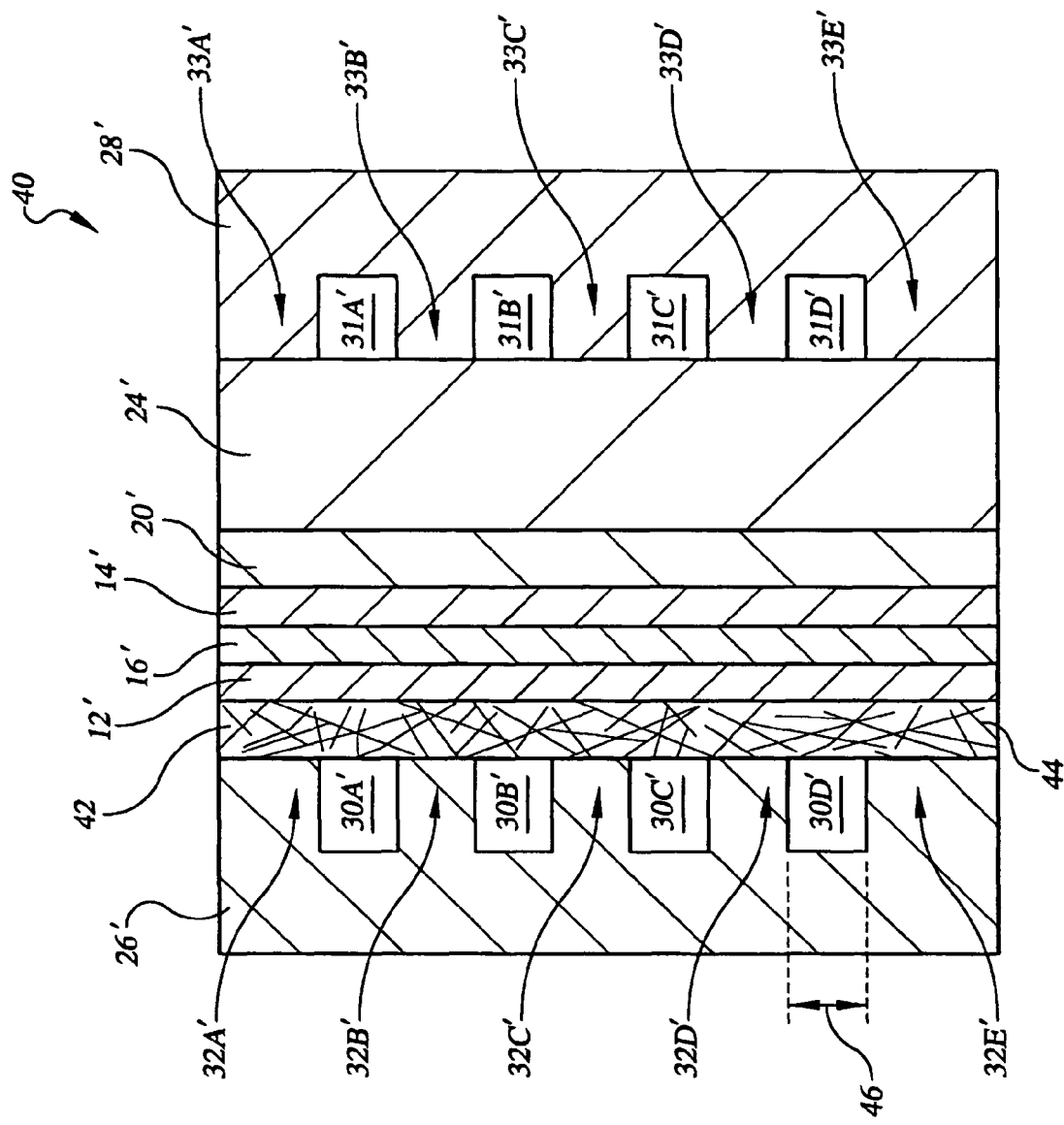
FIG. 2 is a simplified schematic representation of a preferred embodiment of a fuel cell with randomly-dispersed carbon fibers in a backing layer constructed in accordance with the present invention.

FIG. 2 shows the present invention of a fuel cell with randomly-dispersed carbon fibers in a backing layer and is generally designated by the reference numeral 40. For purposes of efficiency, those components of the present invention that are virtually the same as comparable elements as the prior art fuel cell 10 described above and shown in FIG. 1 are shown in FIG. 2 having a prime of the same reference numeral shown in FIG. 1. For example, the proton exchange membrane 16 shown in FIG. 1 is designated by the reference numeral 16' in FIG. 2.

The present invention of a fuel cell with randomly-dispersed carbon fibers in a backing layer includes a first catalyst 12', such as an anode catalyst, and a second catalyst 14', such as a cathode catalyst, secured to opposed surfaces of an electrolyte 16', such as a "PEM". The fuel cell 40 also includes a cathode diffusion layer 20' secured to the second catalyst 14'; a cathode substrate 24' secured to the cathode diffusion layer 20'; a second flow field 28' secured in fluid communication with the second catalyst 14'; and, a first flow field 26' secured in fluid communication with the first catalyst 12'. The first flow field 26' defines a plurality of flow channels 30A', 30B', 30C', 30D' between a plurality of ribs 32A', 32B', 32C', 32D', 32E' of the first flow field 26'.

The fuel cell 40 also includes a backing layer 42 secured between and in fluid communication with the first catalyst 12' and the first flow field 26'. The backing layer 42 replaces the anode diffusion layer 18 and anode substrate 22 of the prior art fuel cell 10 as shown in FIG. 1. The backing layer 42 is made from between 5 weight percent ("wt %") and 25 wt % carbon black, between 50 wt % and 90 wt % carbon fibers, and between 5 wt % and 25 wt % of a hydrophobic polymer. The carbon fibers 44 have a length that is at least twice as long as a width 46 of a widest flow channel 30D', wherein the width 46 of the widest flow channel 30D' is a shortest distance between flow field ribs 32D', 32E' defining the widest flow channel 30D' of the first flow field 26'. The carbon fibers 44 are randomly dispersed with the carbon black and hydrophobic polymer within the backing layer 42, resulting in the layer 42 having a thickness between about 25-250 microns thick, wherein the thickness is a shortest distance through the layer between the first catalyst 12' and the first flow field 26'. The layer 42 also has a compressive strength of greater than 5 Kg/cm².

Exemplary carbon blacks appropriate for use in the backing layer 42 include a carbon black available under the product name "VULCAN XC-72" from the Cabot Corporation of Billerica, Mass., U.S.A. A suitable hydrophobic polymer is polytetrafluoroethylene ("PTFE") available under the product name "PTFE Grace 30" from the E.I. du Pont de Nemours and Company of Wilmington, Del., U.S.A. Other acceptable hydrophobic polymers are known in the art. A suitable carbon fiber is available under the product name "SIGRAFIL C" from the SGL Carbon Group company of St. Marys, Pa., U.S.A. A family of high strength carbon fibers is also available from the BP Amoco Performance Products company of Warrensville Heights, Ohio, U.S.A.

FIG. 2 shows the fuel cell 40 having parallel flow channels of similar or identical widths, and wherein the carbon fibers have a length that is at least twice as long as the width 46 of flow channel 30D'. While FIG. 2 shows the fuel cell 40 having parallel first flow channels 30A', 30B', 30C', 30D', other exemplary flow channels, such as serpentine channels, voids of various dimensions, or voids in a "checkerboard" arrangement around square-shaped flow field ribs, may be used as known in the art. The operation of a fuel cell with flow channels in such a "checkerboard" arrangement is well known as disclosed in U.S. Pat. No. 5,503,944, that issued on Apr. 2, 1996 to Meyer et al., which patent is owned by the owner of all rights in the present invention. For purposes of the present invention where flow channels (not shown) have dissimilar widths, the length of the carbon fibers 44 would be at least twice as long as a width of a widest flow channel (not shown) of dissimilar width flow channels.

The carbon fibers 44 serve to enhance electrical conductivity within the fuel cell 40 and to contribute to the backing layer 42 having a minimal thickness with an adequate flexural and compressive strength so that the layer 42 can withstand an axial pressure load and prevent the layer 42 from deforming into flow channels 30A', 30B', 30C', 30D'.

As is known, prior art fuel cells generate water at a cathode catalyst as fuel cell product water. If the product water is not efficiently removed from the cathode catalyst, the product water will accumulate adjacent the cathode catalyst effectively "flooding" the catalyst. By "flooding" the catalyst, it is meant that a gaseous oxidant reactant stream cannot efficiently flow or diffuse into contact with the cathode catalyst. Because the oxidant cannot contact the flooded cathode catalyst, performance of the fuel cell is degraded. Therefore, in order to efficiently remove fuel cell product water, known cathode diffusion layer 20 and cathode substrate layer 24 are dimensioned to define specific ranges of pore sizes and porosities, or percent pore volumes. However, such efficient movement of fuel cell product water is not a requirement of the prior art fuel cell 10 anode diffusion layer 18 or anode substrate layer 22.

Consequently, in a preferred embodiment of the present invention, the backing layer 42 is only secured adjacent the anode catalyst 12', as shown in FIG. 2. The backing layer 42 secured adjacent the anode catalyst 12' may therefore be thinner and more hydrophilic than the prior art anode substrate 22 that is secured adjacent to the anode catalyst 12' of the prior art fuel cell 10. Hence, a preferred embodiment of the invention is the fuel cell 40 with the backing layer 42 secured adjacent to the anode catalyst 12'. However, alternative embodiments of the invention include a fuel cell 40 with backing layers 42 secured adjacent to both the anode and cathode catalysts 12', 14', or secured adjacent to only the cathode catalyst 14'.

The invention includes a method of manufacturing the backing layer 42 including the steps of: (a) randomly dispersing the carbon black, carbon fibers 44, and hydrophobic polymer in an aqueous suspension, (b) then removing the water from the aqueous suspension by filtration or other water removal methods known in the art, (c) and then thermally processing the carbon black, carbon fibers 44 and hydrophobic polymer constituents of the layer to melt the hydrophobic polymer. The thermal processing is normally done in air for 5-15 minutes at a temperature equal to or within plus or minus 15 degrees centigrade of the melting point or cure point of the hydrophobic polymer. The resulting backing layer may then be bonded to an anode catalyst by known means.

Where the invention is the FIG. 2 embodiment having the backing layer 42 secured only adjacent the second catalyst 12', the fuel cell 40 may be fabricated as follows. First, the cathode diffusion layer 20' is applied to the cathode substrate 24' by known means. Second, anode and cathode catalysts 12', 14' are applied to an electrolyte 16', such as a "PEM" to form a membrane electrode assembly ("MEA"). Then the "MEA" is bonded to a cathode diffusion layer 20'. Finally, the backing layer 42, made as described above, is bonded to the anode catalyst 12' by known means.

The patents referred to above are hereby incorporated herein by reference.

While the present invention has been described and illustrated with respect to a particular construction of a fuel cell with randomly-dispersed carbon fibers in a backing layer it is to be understood that the invention is not to be limited to the described and illustrated embodiments. Accordingly, reference should be made primarily to the following claims rather than the foregoing description to determine the scope of the invention.

What is claimed is:

1. A method of operating a fuel cell (40) for producing electricity from reducing fluid and oxygen containing oxidant reactant streams flowing through the fuel cell (40), comprising the steps of:
   a. providing a first catalyst (12') and a second catalyst (14') secured to opposed surfaces of an electrolyte (16');
   b. defining a first flow field (26') secured in fluid communication with the first catalyst (12'), the first flow field (26') defining a plurality of flow channels (30A', 30B', 30C', 30D') between a plurality of ribs (32A', 32B', 32C', 32D', 32E') of the first flow field (26');
   c. providing a backing layer (42) secured between and in fluid communication with the first flow field (26') and the first catalyst (12');
   d. preventing the backing layer (42) from deforming into the flow channels (30A', 30B', 30C', 30D') during operation of the fuel cell (40) by the backing layer (42) including;
      i. between 5 wt % and 25 wt % carbon black;
      ii. between 50 wt % and 90 wt % carbon fibers (44), where the carbon fibers (44) have a length that is at least twice as long as a width (46) of a widest flow channel (30'D), wherein the width (46) of the widest flow channel (30'D) is a shortest distance between flow field ribs (32D', 32E') defining the widest flow channel (30D') of the first flow field (26');
      iii. between 5 wt % and 25 wt % of a hydrophobic polymer; and,
      iv. the carbon fibers (44) being randomly dispersed with the carbon black and hydrophobic polymer so that the resulting backing layer (42) has a thickness between the first catalyst (12') and the first flow field (26') of between about 25 and 250 microns, and a compressive strength greater than 5 kgf/cm$^2$.

2. A method of manufacturing a fuel cell (40) comprising the steps of:
   a. securing a cathode diffusion layer (20') to a cathode substrate (24');
   b. securing an anode catalyst (12') and a cathode catalyst (14') to opposed surfaces of an electrolyte (16') to form a membrane electrode assembly;
   c. bonding the cathode catalyst (14') to the cathode diffusion layer (20'); and,
   d. bonding a backing layer (42) to the anode catalyst (12'), the backing layer (42) including;
      i. between 5 wt % and 25 wt % carbon black;
      ii. between 50 wt % and 90 wt % carbon fibers (44), where the carbon fibers (44) have a length that is at least twice as long as a width (46) of a widest flow channel (30'D), wherein the width (46) of the widest flow channel (30'D) is a shortest distance between flow field ribs (32D', 32E') defining the widest flow channel (30D') of the first flow field (26')
      iii. between 5 wt % and 25 wt % of a hydrophobic polymer;

iv. the carbon fibers (44) being randomly dispersed with the carbon black and hydrophobic polymer so that the resulting backing layer (42) has a thickness between the first catalyst (12') and the first flow field (26') of between about 25 and 250 microns, and a compressive strength greater than 5 kgf/cm$^2$; and, v. so that the backing layer (42) is prevented from deforming into the flow channels (30A', 30B', 30C', 30D') during operation of the fuel cell (40).

\* \* \* \* \*